United States Patent
Hosoda

(10) Patent No.: US 9,449,636 B2
(45) Date of Patent: Sep. 20, 2016

(54) OPTICAL DISC ACTUATOR AND OPTICAL DISC DRIVE DEVICE

(71) Applicant: Funai Electric Co., Ltd., Osaka (JP)

(72) Inventor: Ryozo Hosoda, Sakai (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 14/507,830

(22) Filed: Oct. 7, 2014

(65) Prior Publication Data

US 2015/0121403 A1 Apr. 30, 2015

(30) Foreign Application Priority Data

Oct. 31, 2013 (JP) ................................. 2013-226648

(51) Int. Cl.
G11B 7/09 (2006.01)

(52) U.S. Cl.
CPC ............. *G11B 7/0935* (2013.01); *G11B 7/093* (2013.01); *G11B 7/0933* (2013.01)

(58) Field of Classification Search
None
See application file for complete search history.

(56) References Cited

U.S. PATENT DOCUMENTS

2004/0252596 A1* 12/2004 Cho et al. .................. 369/44.12

FOREIGN PATENT DOCUMENTS

| JP | H07-093778 A | 4/1995 |
| JP | H07-210884 A | 8/1995 |
| JP | 2005-166219 A | 6/2005 |
| JP | 2006-040415 A | 2/2006 |
| JP | 2007-080305 A | 3/2007 |

* cited by examiner

*Primary Examiner* — Brian Butcher
(74) *Attorney, Agent, or Firm* — Yokoi & Co., U.S.A.; Toshiyuki Yokoi

(57) ABSTRACT

The present invention provides a printed coil substrate for an optical disc actuator so that the sensitivity will change as little as possible when shifting in a focal direction and a tracking direction. Although the coil patterns laminated at a corresponding position have approximately same shape, center locations in shape of the tracking coil and the focus coils are displaced between the neighboring substrate layers, and the center locations in shape are displaced by a predetermined distance toward a direction of driving the movable portion driven by the coils. Even when the coil pattern of the first layer is moved in a direction of leaving from the position where magnetic force of the magnet is strong, the coil pattern of the second layer is simultaneously moved into the position where magnetic force of the magnet is strong. Therefore, the change of the sensitivity can be relatively compensated.

11 Claims, 15 Drawing Sheets

F I G . 1
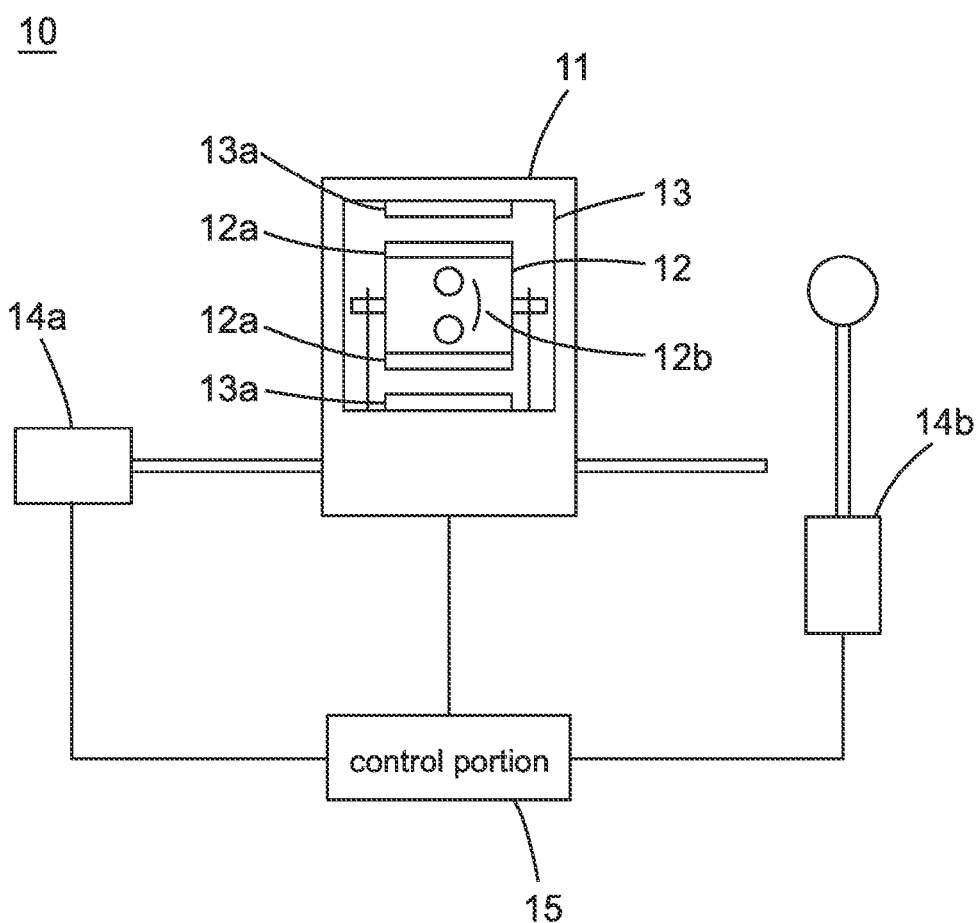

FIG.11
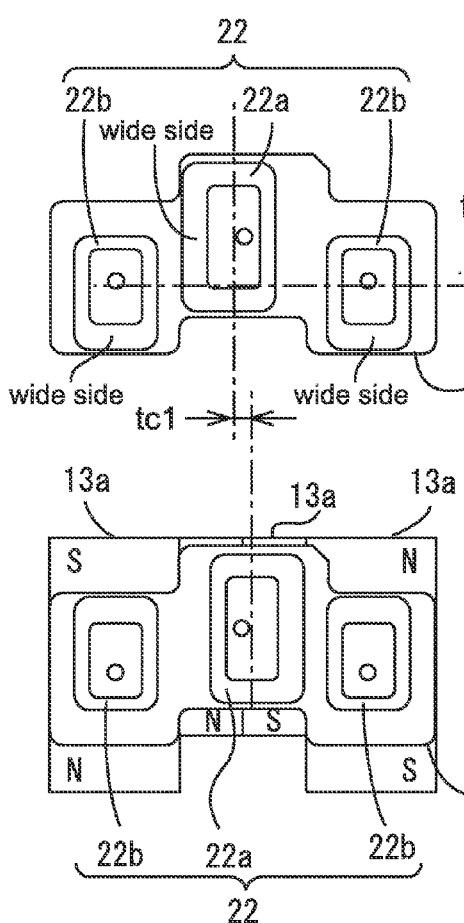
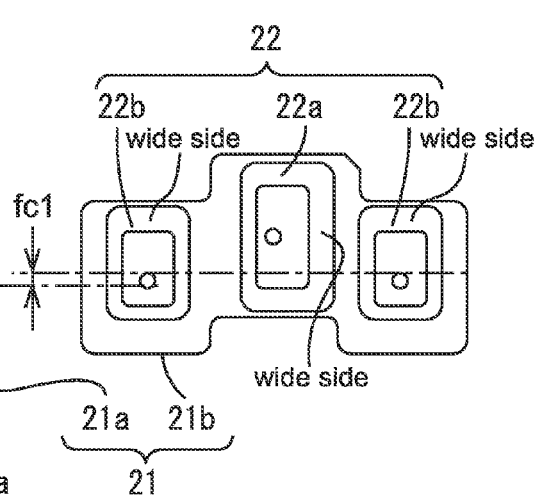
(a) first layer
(b) second layer
(example of countermeasure of focus shift)
(c) second layer
(example of countermeasure of tracking shift)

F I G . 1 2
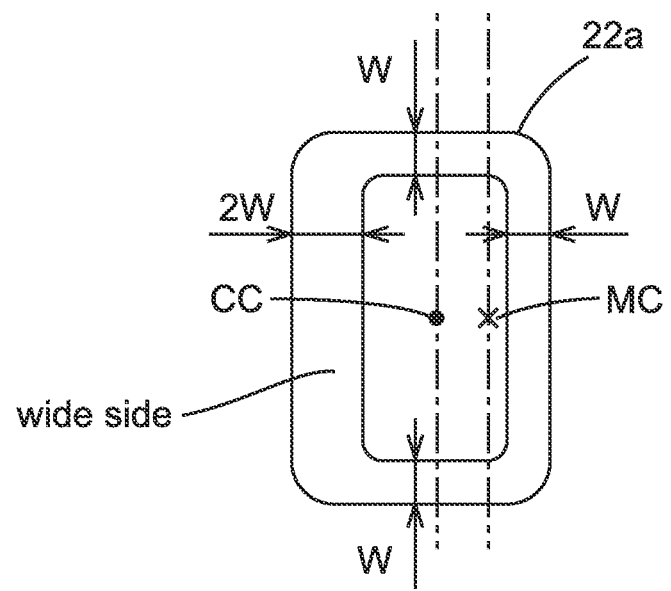

F I G . 1 4
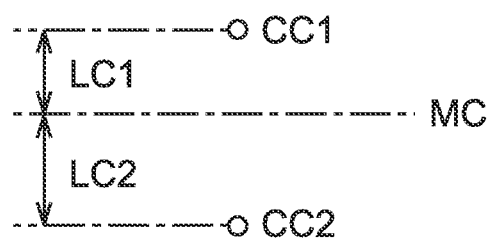

OPTICAL DISC ACTUATOR AND OPTICAL DISC DRIVE DEVICE

CROSS-REFERENCES TO RELATED APPLICATIONS

This patent specification is based on Japanese patent application, No. 2013-226648 filed on Oct. 31, 2013 in the Japan Patent Office, the entire contents of which are incorporated by reference herein.

BACKGROUND OF THE INVENTION

1. Field of the Invention

The present invention relates to a printed coil substrate for an optical disc actuator, an optical disc pickup, and an optical disc drive device.

2. Description of the Related Art

An optical disc pickup is equipped on an optical disc drive device, and an optical disc actuator is equipped on the optical disc pickup. In the optical disc actuator, in order to drive a movable portion having an objective lens relatively to a fixed portion, a magnet is equipped on one of the movable portion and the fixed portion, and an electromagnetic coil is equipped on the other. The electromagnetic coil is attracted and repelled by the magnet by magnetic flux generated when a current is made to flow, and the movable portion is driven relatively to the fixed portion. Note that the fixed portion itself is linearly driven in a radial direction of an optical disc. Thus, a surface of the optical disc can be scanned because the fixed portion is linearly driven in the radial direction while the optical disc is rotary driven.

The electromagnetic coil can be formed of a wire coil or a printed coil substrate, which is made by forming a coil pattern on a flexible substrate.

In the optical disc actuator, the movable portion is held at a neutral position in terms of design so that magnetic force from the magnet (permanent magnet) can be obtained the most. When the movable portion is shifted (moved) in a focal direction or a tracking direction from the neutral position, an effective part of the coil, which generates a driving force, is also shifted. Therefore, sensitivity is deteriorated and recording and reproducing performance are negatively affected. Note that the sensitivity is a general term of accuracy for moving the movable portion to an appropriate position based on attraction force and repulsive force generated when an electric current is applied to the coil of the movable portion in the magnetic flux of the magnet.

In particular, in an actuator formed of the printed coil, wiring for wires or intermediate substrates and through holes for other layers should be provided on the flexible substrate in addition to the coil pattern. Therefore, it is difficult to widely provide the effective part of the coil on a surface opposite to the magnet so that the deterioration of sensitivity is suppressed compared to the actuator formed of the conventional wire coil. In addition, in order to obtain the same performance as the wire coil, the printed coil itself should be large, and therefore the actuator should be large and an optical pickup on which the actuator is mounted should be large. Furthermore, since the size of the printed coil itself affects a quantity obtainable from a base material, if the size of the printed coil itself becomes large, the quantity obtainable from the base material is reduced and manufacturing cost is increased.

As the conventional printed coil substrate, Patent documents 1 to 5 are known.

In Patent document 1, in each layer of a first layer and a second layer of a printed coil substrate of two-layer constitution, magnitude of a coil pattern of the most outer layer (first layer) provided with a land part and that of a coil pattern of an adjacent layer (second layer) are changed. In the coil pattern of the layer having the land part, width (vertical direction) is made small so as not to overlap with the land part in the same layer.

In Patent document 2, in a plurality of printed coil substrates, pattern width of a coil pattern formed in a layer near a magnet is made narrower than the pattern width of the coil pattern formed in a layer far from the magnet.

In Patent document 3, a plurality of printed substrates on which a focusing coil and a tracking coil are formed as a circuit pattern are laminated so that the focusing coil and the tracking coil are not overlapped in a thickness direction of the printed substrates.

In Patent document 4, each of coil elements is composed of a circuit pattern formed on a printed substrate, shapes of the circuit pattern are different in each phase, and a length of an effective conductive part contributing to a driving force of the coil is set shorter in an effective coil close to the magnet than others.

In Patent document 5, coil patterns formed on printed coil substrates are made different depending on each layer. In other words, the coil patterns having different shapes are used and a relative position relation is made different.

Patent document 1: Japanese Patent Application Laid-Open No. 2005-166219
Patent document 2: Japanese Patent Application Laid-Open No. 2007-080305
Patent document 3: Japanese Patent Application Laid-Open No. H07-093778
Patent document 4: Japanese Patent Application Laid-Open No. H07-210884
Patent document 5: Japanese Patent Application Laid-Open No. 2006-040415

BRIEF SUMMARY OF THE INVENTION

When using the conventional printed coil substrates, the following problems are encountered.

In Patent document 1, although the influence of the land part can be reduced, sensitivity is largely changed when shifting in a focusing direction and in a tracking direction.

In Patent documents 2 and 4, although the difference caused by the change of distance from the magnet in a plurality of the printed coil substrates can be solved, the sensitivity is largely changed.

In Patent document 3, the sensitivity is largely changed.

In Patent document 5, product design is not easy because the coil patterns formed on the printed coil substrates are different depending on each layer.

The present invention provides a printed coil substrate for an optical disc actuator, an optical disc pickup, and an optical disc drive device so that the sensitivity will change as little as possible when shifting in a focal direction and a tracking direction.

One aspect of the present invention provides a printed coil substrate for an optical disc actuator so as to drive a movable portion of the optical disc actuator relatively to a fixed portion, wherein the printed coil substrate is formed by a plurality of laminated substrate layers, coil patterns are formed on predetermined portions of each of the substrate layers, the coil patterns of the substrate layers having an approximately same shape are connected with each other between the coil patterns laminated at a corresponding position so that coils are formed at each of the predetermined portions, center locations in shape of the coil patterns, which are formed on the substrate layers to form the coils, are displaced between neighboring substrate layers, and the center locations are displaced by a predetermined distance toward a direction of driving the movable portion driven by each of the coils.

In the above described configuration, if the coil patterns are formed on predetermined portions of each of the substrate layers and the coil patterns having an approximately same shape are connected with each other between the coil patterns laminated at a corresponding position while the substrate layers are laminated, the coils are formed at each of the predetermined portions.

Conventionally, the center locations in shape of the coil patterns, which are formed on the substrate layers to form the coils, are matched with a center of the corresponding magnet. In the configuration of the present aspect, however, the center locations in shape of the coil patterns, which are formed on the substrate layers to form the coils, are displaced between neighboring substrate layers, and the center locations are displaced by a predetermined distance toward a direction of driving the movable portion driven by each of the coils. As an example, if the coil pattern of the first layer and the coil pattern of the second layer are separated with each other in an opposing direction from the center of the magnet, a width of magnetic flux formed by two substrate layers becomes wide in a so-called shift direction.

Since the width of magnetic flux becomes wide, the change of the sensitivity of the coils of the movable portion becomes flat with respect to the fixed portion of the magnet.

Also in the optical disc pickup or the optical disc drive device having the optical disc actuator of such configuration, the same operations and effects are achieved.

BRIEF DESCRIPTION OF THE DRAWINGS

FIG. 1 is a schematic block diagram of an optical disc drive device.

FIG. 11 is a diagram showing a variation example of the coil patterns.

FIG. 12 is a diagram showing the coil patterns with an enlarged view.

FIG. 14 is a diagram showing a distance of displacing center locations.

DETAILED DESCRIPTION OF THE INVENTION (First Embodiment)

Hereafter, with reference to the drawings, embodiments of the present invention will be explained.

Figure 2:
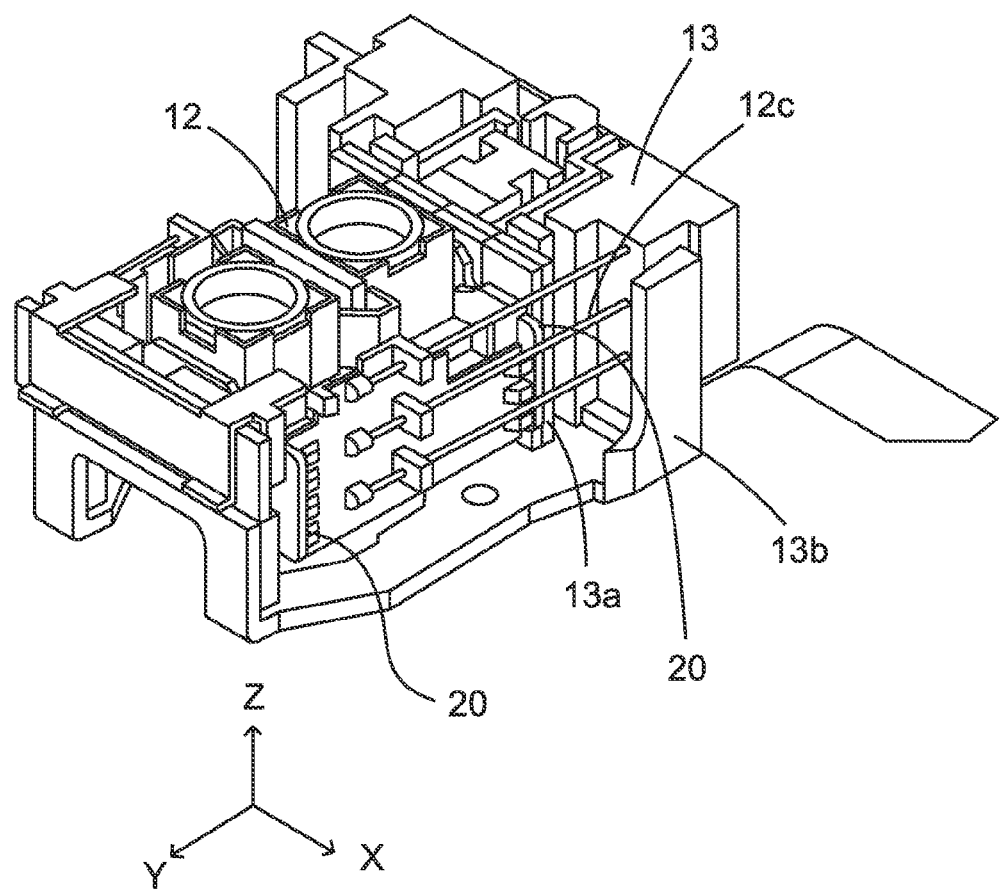
FIG. 2 is a perspective view of an optical disc pickup.
Figure 3:
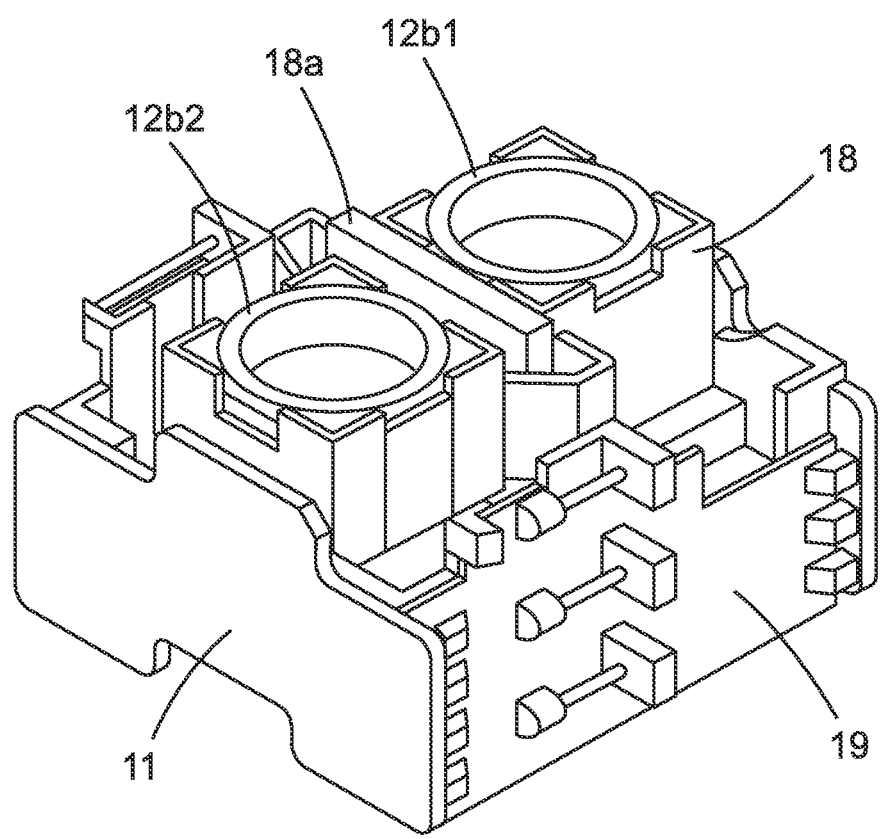
FIG. 3 is a perspective view of a movable portion.

FIG. 1 is a schematic block diagram of an optical disc drive device. FIG. 2 is a perspective view of an optical disc pickup including a fixed portion. FIG. 3 is a perspective view of a movable portion.

An optical disc pickup 11 is equipped on an optical disc drive device 10. An optical disc actuator, which will be explained later, is equipped on the optical disc pickup 11.

As shown in FIG. 1, in the optical disc actuator, in order to drive a movable portion 12 having an objective lens 12b relatively to a fixed portion 13, a magnet 13a is equipped on one of the movable portion 12 and the fixed portion 13, and an electromagnetic coil 12a is equipped on the other. The electromagnetic coil 12a is attracted and repelled by the magnet 13a by magnetic flux generated when a current is made to flow, and the movable portion 12 is driven relatively to the fixed portion 13. Note that the fixed portion 13 itself is linearly driven in a radial direction of a not illustrated optical disc by a stepping motor 14a. Thus, a surface of the optical disc can be scanned because the fixed portion 13 is linearly driven in the radial direction (capable of moving linearly) while the optical disc is rotary driven (capable of moving rotatively) by a DC motor 14b. Furthermore, a control portion 15 is equipped so as to control the driving of the stepping motor 14a and the DC motor 14b and control recording and reproducing executed by the optical disc pickup 11.

As shown in FIG. 2, the optical disc pickup 11 has the movable portion 12 and the fixed portion 13, and the movable portion 12 is floatingly supported on the fixed portion 13 by wires 12c, which are equipped three on the left and three on the right. The "floatingly supported" means, in general, the movable portion 12 is supported by the fixed portion 13 via an elastic body. Since the elastic body is deformed, a relative positional relation between the fixed portion 13 and the movable portion 12 can be changed by a minute distance. Therefore, the wires 12c, three on the left and three on the right, are corresponding to the elastic body. As a result, the movable portion 12 can be moved by a minute distance at least in a focal direction (Z-axis direction), which is a direction of approaching to and separating from a surface of the optical disc, and in a tracking direction (X-axis direction), which is a radial direction of the optical disc. Note that the movement by a minute distance is referred to as "shift".

As explained above, the coil patterns have a focus coil 22b to drive the movable portion 12 in the Z-axis direction and a tracking coil 22a to drive the movable portion 12 in an XY plane (X-axis direction).

An objective lens 12b, which is composed of a first objective lens 12b1 and a second objective lens 12b2, is fixed on the movable portion 12. The first objective lens 12b1 and the second objective lens 12b2 are corresponding respectively to Blu-ray disc and other optical discs. Note that the objective lens 12b is held by a lens holder 18, and a lens protector 18a is equipped on the lens holder 18 projecting between the first objective lens 12b1 and the second objective lens 12b2 so that the objective lenses are not interfere with the surface of the optical disc.

The wires 12c also have a function of supplying the power to the electromagnetic coil 12a. Intermediate substrates 19 are provided on both an inner side and an outer side of the radial direction of the movable portion 12 so as to electrically connect the wires 12c with the electromagnetic coil 12a and to support the movable portion 12 itself. Note that the magnet 13a is a so-called bipolar magnet and the magnet 13a is supported by a yoke base 13b.

Figure 4:
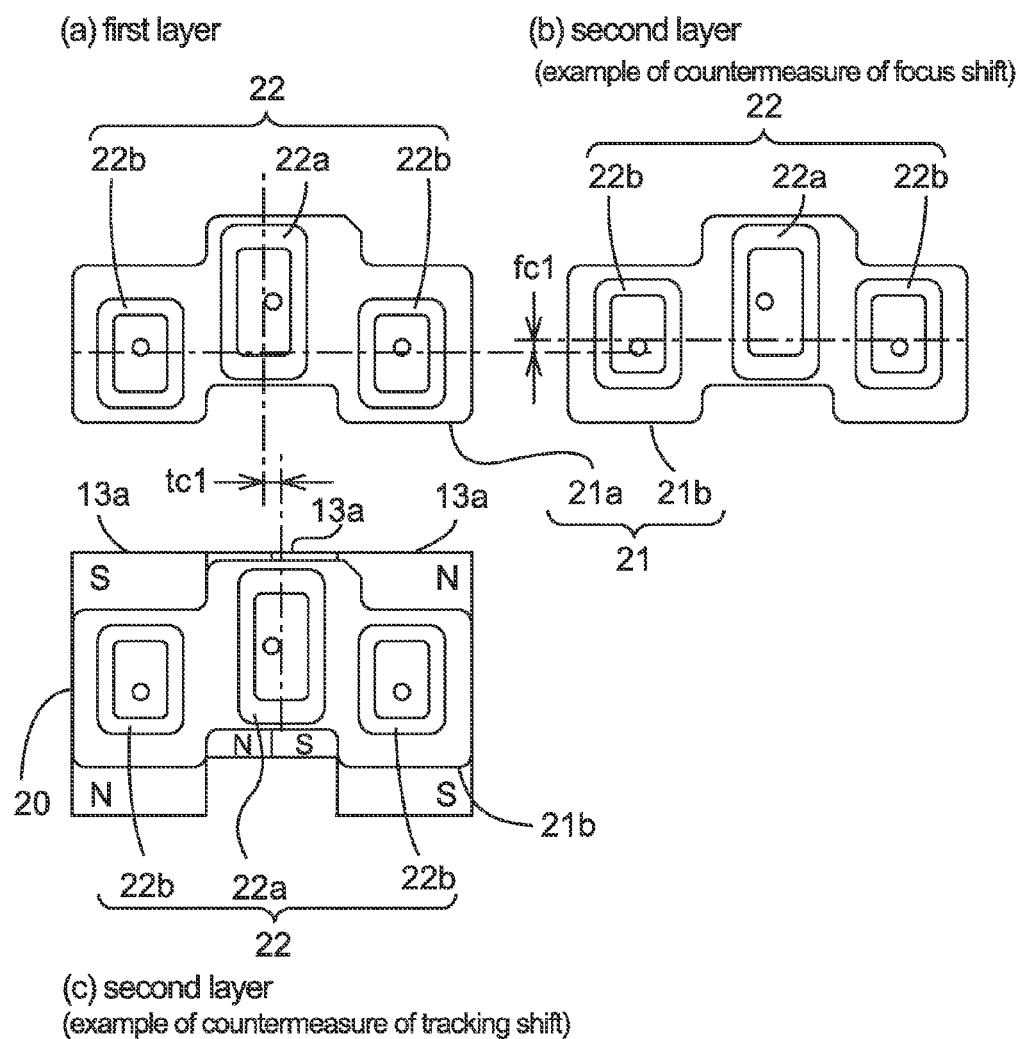
FIG. 4 is a schematic diagram showing a laminated state of printed coil substrates.

FIG. 4 is a schematic diagram showing a laminated state of the printed coil substrates.

The electromagnetic coil 12a is composed of a printed coil substrate 20. The printed coil substrate 20 is formed by a plurality of laminated substrate layers 21, which are made by a flexible substrate. Each of the substrate layers 21 is formed by sandwiching both ends of a coil pattern 22 of a spiral shape, which is arranged at a predetermined position, between insulation boards. When a plurality of the substrate layers 21 is defined as a substrate layer 21a for the first layer and a substrate layer 21b for the second layer, shapes of the coil patterns 22 of the substrate layer 21a and the substrate layer 21b are approximately same.

However, positions of through holes, which are used for electrically connecting the coil patterns 22, 22 to form the coil while two of the substrate layers 21a, 21b are laminated, are different.

Furthermore, the coil pattern 22 is composed of a tracking coil 22a arranged at the center, and focus coils 22b, 22b arranged at both sides of the tracking coil 22a.

Although the coil patterns, which are overlapped at a corresponding position when laminated, are approximately same shape, center locations in shape of the tracking coil 22a and the focus coils 22b, 22b are not matched between the neighboring substrate layers 21a, 21b.

The center locations are specified to be displaced by a predetermined distance in a direction of driving the movable portion 12 by each of the coils.

In an example shown in FIG. 4, the centers of the tracking coil 22a are displaced by a coil width (tc1) in the width direction between the substrate layer 21a of the first layer and the substrate layer 21b of the second layer. In addition, the centers of the focus coil 22b are displaced by a coil width (fc1) in the vertical direction between the substrate layer 21a of the first layer and the substrate layer 21b of the second layer. The width direction is a tracking direction, which is a direction of driving the movable portion 12 by the tracking coil 22a. The vertical direction is a focal direction which is a direction of driving the movable portion 12 by the focus coil 22b.

In other words, if the shape center of the focus coil 22b of the substrate layer 21a of the first layer is offset upward from a position where magnetic force of the opposing magnet 13a is strong, for example, the shape center of the focus coil 22b of the substrate layer 21b of the second layer is offset downward, contrary to the first layer. On the contrary, if the shape center of the focus coil 22b of the substrate layer 21a of the first layer is offset downward from the position where magnetic force of the opposite magnet 13a is strong, the shape center of the focus coil 22b of the substrate layer 21b of the second layer is offset upward, contrary to the first layer. Offset amounts of the first layer and the second layer are decided in the design stage so that difference of magnetic flux density distribution between the layers and change of the sensitivity within the necessary shift range become the least. Thus, change of the sensitivity during a focus shift can be suppressed.

As for the tracking coil 22a, the center locations can be arranged in the same way although the direction of the offset is horizontal. In other words, if the shape center of the tracking coil 22a of the substrate layer 21a of the first layer is offset leftward from the position where magnetic force of the magnet 13a is strong, for example, the shape center of the tracking coil 22a of the substrate layer 21b of the second layer is offset rightward, contrary to the first layer. On the contrary, if the shape center of the tracking coil 22a of the substrate layer 21a of the first layer is offset rightward from the position where magnetic force of the magnet 13a is strong, the tracking coil 22a of the substrate layer 21b of the second layer is offset leftward, contrary to the first layer.

If a width from an innermost peripheral portion to an outermost peripheral portion of the coil pattern is defined as "coil width", the predetermined distance to be displaced is approximately corresponding to the coil width in this example. The coil width is 0.1 mm in the tracking coil 22a and 0.5 mm in the focus coil 22b. Therefore, the coil pattern of the focus coil 22b is displaced longer distance than the coil pattern of the tracking coil 22a.

In addition, a distance of driving the movable portion 12 by the focus coil 22b is longer than a distance of driving the movable portion 12 by the tracking coil 22a. Therefore, the distance to be displaced varies according to the direction of driving the movable portion 12 by each of the coils, and the distance to be displaced is longer in a direction toward which a drive distance of the movable portion 12 is longer than a direction toward which the drive distance is shorter.

Figure 5:
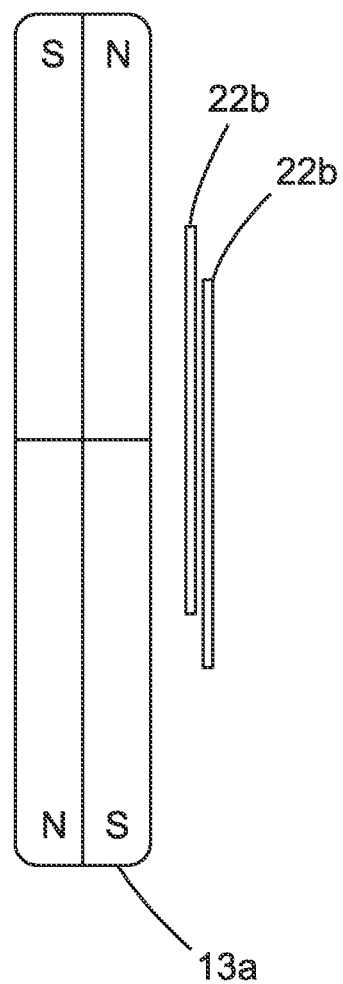
FIG. 5 is a schematic diagram showing an overlapped state of coil patterns.

FIG. 5 is a schematic diagram showing an overlapped state of coil patterns.

The figure shows a state that two focus coils 22b, one is for the substrate layer 21a of the first layer and the other is for the substrate layer 21b, are laminated while being relatively displaced vertically. Although the figure shows the focus coils 22b, the tracking coils 22a are laminated while being relatively displaced horizontally in the same way.

Figure 6:
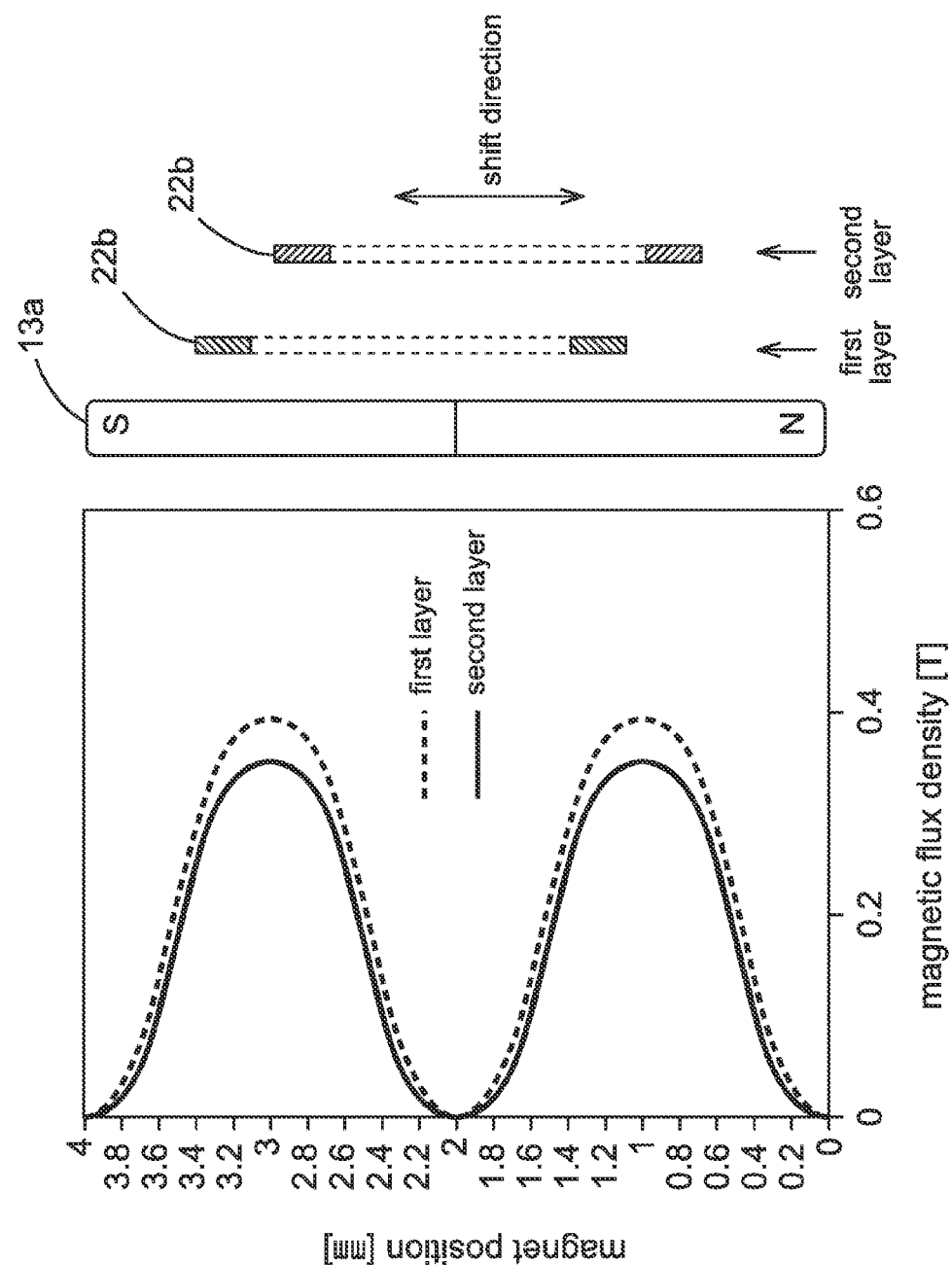
FIG. 6 is a schematic diagram showing magnetic flux of a magnet and a position of the coil patterns.

FIG. 6 is a schematic diagram showing magnetic flux of the magnet and a position of the coil patterns. Note that the magnet 13a is roughly illustrated.

Strictly speaking, magnetic flux density of the magnet 13a reached to the substrate layer 21a of the first layer is not same as magnetic flux density of the magnet 13a reached to the substrate layer 21b of the second layer. This is because the magnetic flux is stronger at the nearer side of the magnet 13a and weaker at the farther side. Considering that the magnetic flux density of the magnet 13a varies as explained above, the center locations in shape of the coil pattern are displaced between the substrate layer 21a of the first layer and the substrate layer 21b of the second layer. If the center locations are displaced, when the movable portion 12 is driven along the tracking direction or the focal direction, the magnetic flux density of the magnet 13a does not suddenly decrease by the extent of increase of the width of the coil pattern. For example, even when the coil pattern of the first layer is moved in a direction of leaving from the position where magnetic force of the magnet 13a is strong, the coil pattern of the second layer is simultaneously moved into the position where magnetic force of the magnet 13a is strong. Therefore, the change of the sensitivity can be relatively compensated. Of course, the reverse also occurs.

Figure 7:
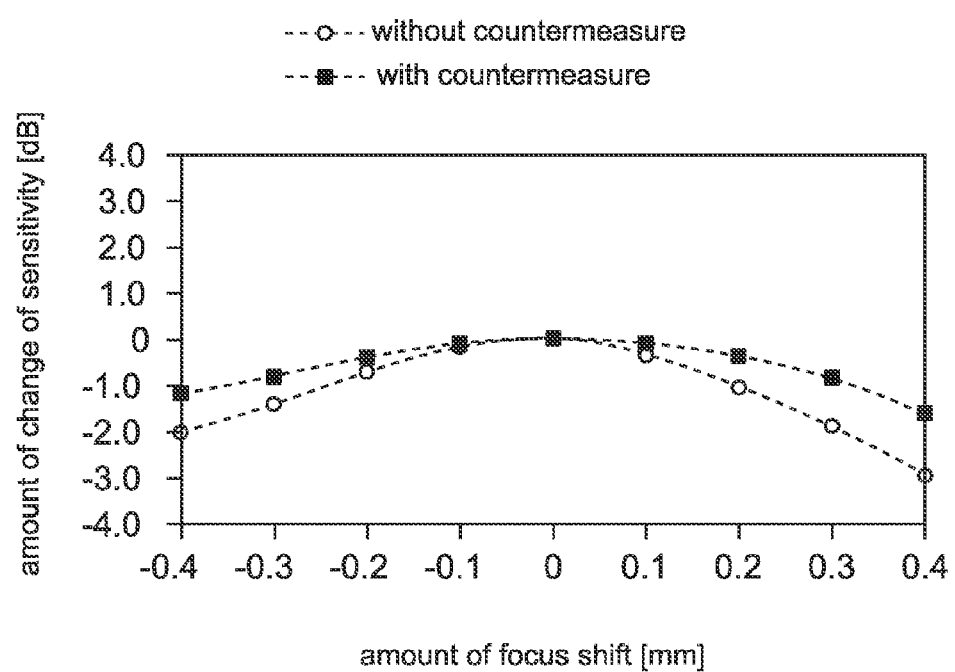
FIG. 7 is a diagram showing an amount of change of sensitivity before and after countermeasure is applied to a focus coil.
Figure 8:
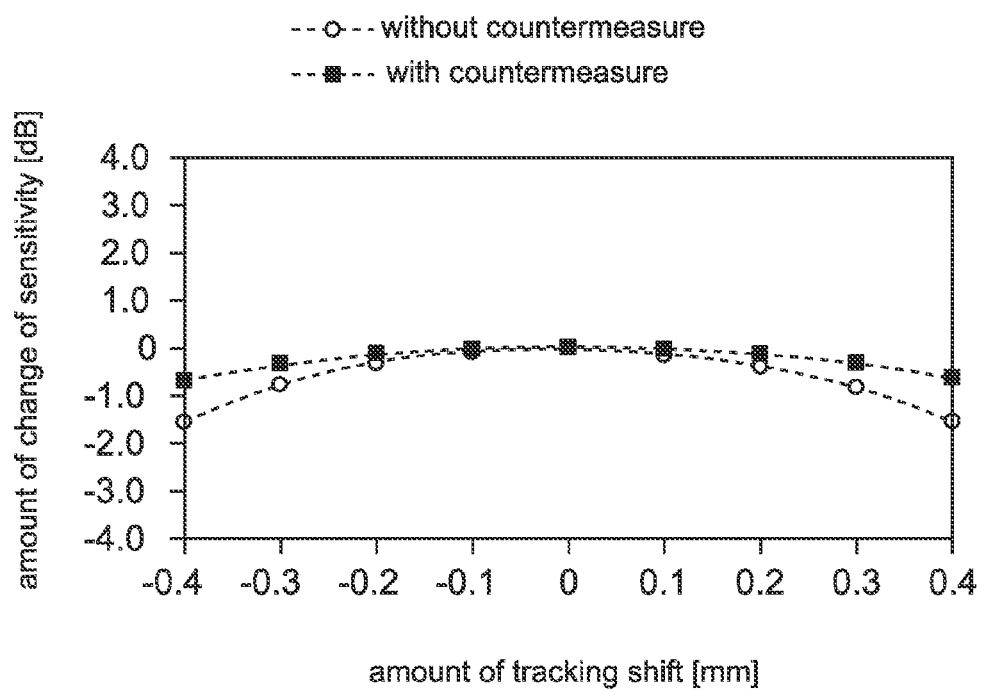
FIG. 8 is a diagram showing an amount of change of sensitivity before and after countermeasure is applied to a tracking coil.

FIG. 7 is a diagram showing an amount of the change of the sensitivity before and after countermeasure is applied to the focus coil. FIG. 8 is a diagram showing an amount of the change of the sensitivity before and after countermeasure is applied to the tracking coil.

If the countermeasure is not applied, as compared to a case where the countermeasure is applied, the amount of change of sensitivity is different more than 1.0 dB at a position where the amount of the focus shift is about 0.4 mm. In addition, as for the amount of tracking shift, almost same result is obtained.

(Second Embodiment)

Figure 9:
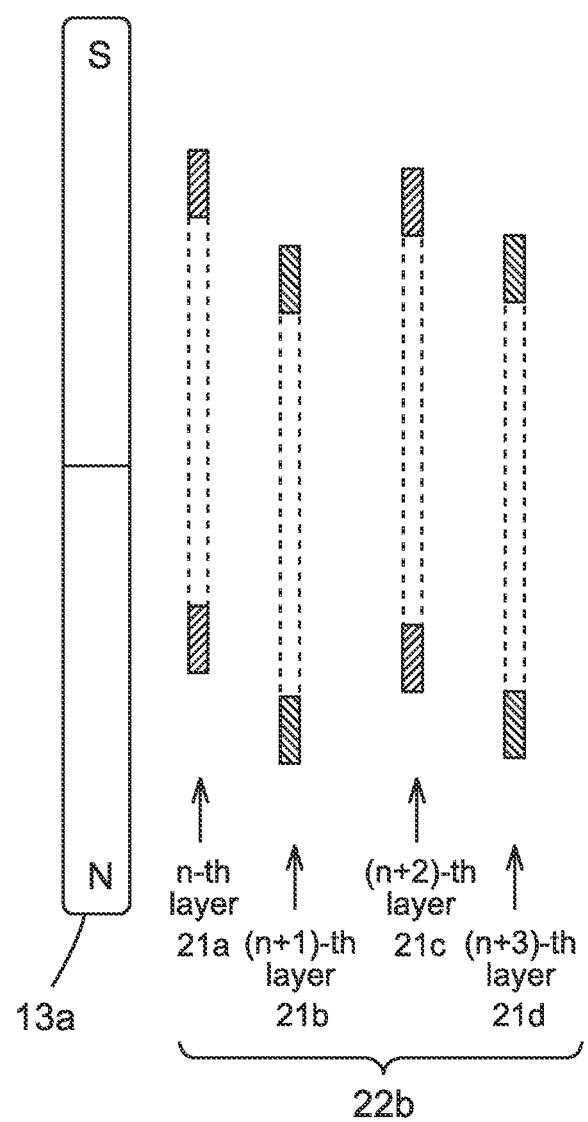
FIG. 9 is a schematic diagram showing an overlapped state of coil patterns when a substrate layer includes four layers.

FIG. 9 is a schematic diagram showing an overlapped state of the coil patterns when the substrate layer includes four layers.

In this example, four layers, substrate layers 21a, 21b, 21c, 21d, are laminated and the coil patterns are also laminated in four layers each for the respective substrate layers. In the example shown in FIG. 9, a direction of displacing the focus coil 22b and the tracking coil 22a is along a direction of driving the movable portion 12, and is alternately changed between the neighboring layers.

In other words, when the substrate layers 21 include more than 3 layers and are formed by n-th layer (n: an integral equal to or more than 1), (n+1)-th layer, (n+2)-th layer, (n+3)-th layer - - -, the direction (offset direction) of the coil patterns of the substrate layer 21 are same between n-th layer and (n+2)-th layer and different between n-th layer and (n+1)-th layer. By alternatively changing the direction of displacing, fluctuation of the magnetic flux is reduced and the magnetic flux can be generated more evenly. Consequently, the amount of change of sensitivity can be more flat.

In other words, in the actuator including a plurality of printed coils, the offset directions are same between n-th layer and (n+2)-th layer. An offset amount is decided in the design stage considering the magnetic flux density of each layer so that the desired sensitivity is obtained in the same way as the case of two layers.

(Third Embodiment)

Figure 10:
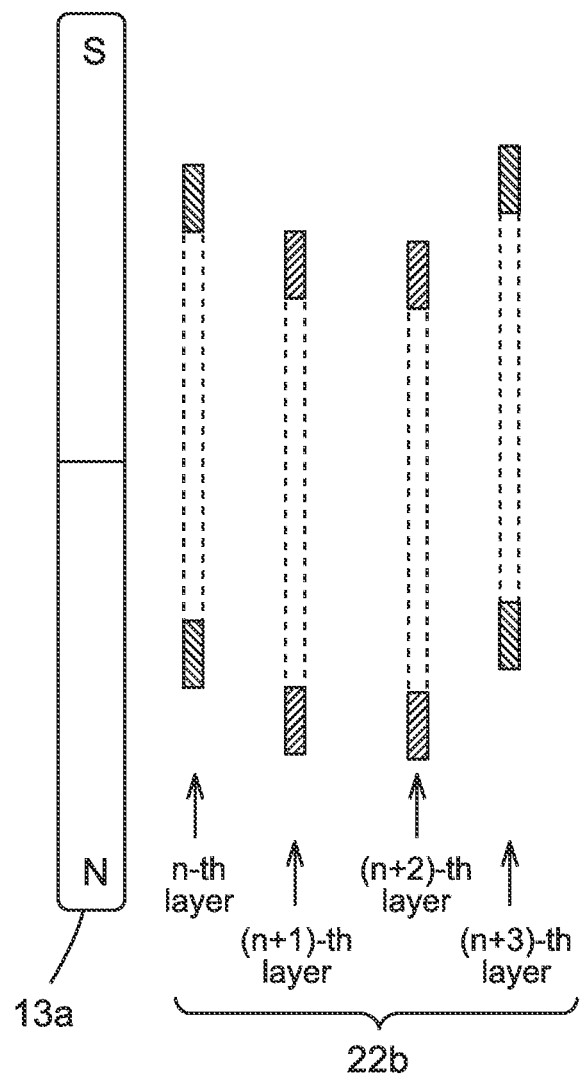
FIG. 10 is a schematic diagram showing a variation example of an overlapped state of coil patterns when a substrate layer includes four layers.

FIG. 10 is a schematic diagram showing a variation example of an overlapped state of coil patterns when a substrate layer includes four layers.

In this example, different from the example in FIG. 9, the direction of displacing is changed in every two layers. If a plurality of the coil patterns is laminated, performance as an electromagnetic coil is improved. Therefore, the performance as an electromagnetic coil can be improved by laminating the layers at the same position while the centers are matched, and at the same time, the amount of change of sensitivity can be flat by laminating a pair of the layers in which the centers are not matched.

(Fourth Embodiment)

FIG. 11 is a diagram showing a variation example of the coil patterns. FIG. 12 is a diagram showing the coil patterns with an enlarged view.

At first, as shown in FIG. 12, the coil patterns of this example is formed to be an approximately rectangular shape, the coil widths are almost same in three sides, and the coil width of the other side is specified to be wide portion (wide side). The wide portion is formed in a direction toward which the center locations of the coil patterns are displaced from the center of the magnet. In other words, the coil widths of the coil patterns are wide at a predetermined direction in the whole circumference, and the wide portion is formed in a direction toward which the center locations of the coil patterns are displaced from the center of the magnet As shown in FIG. 11, the wide portion (wide side) is formed at a left side of the tracking coil 22a in the substrate layer 21a of the first layer, and the wide portion is formed at a right side of the tracking coil 22a in the substrate layer 21b of the second layer. Of course, the tracking coil 22a is displaced to the left side in the substrate layer 21a of the first layer, and the tracking coil 22a is displaced to the right side in the substrate layer 21b of the second layer.

In addition, the above explanation is also applied to the focus coil 22b. The wide portion is formed at a lower side of the focus coil 22b in the substrate layer 21a of the first layer, and the wide portion is formed at an upper side of the focus coil 22b in the substrate layer 21b of the second layer. Of course, the focus coil 22b is displaced to the lower side in the substrate layer 21a of the first layer, and the focus coil 22b is displaced to the upper side in the substrate layer 21b of the second layer.

In the example shown in FIG. 12, the coil width of the wide portion is 2 W, while the coil widths are W at other portions. In addition, the wide portion is arranged at a side of the direction of displacing a center location CC of the coil pattern from a center location MC of the magnet 13a.

As explained above, if there is a space on an external shape, the product can be designed enabling to prevent the sensitivity from being deteriorated against the shift by changing the coil width of the first layer and the second layer taking advantage of the printed coil, in addition to the offset of the center locations in shape of each layer.

(Fifth Embodiment)

Figure 13:
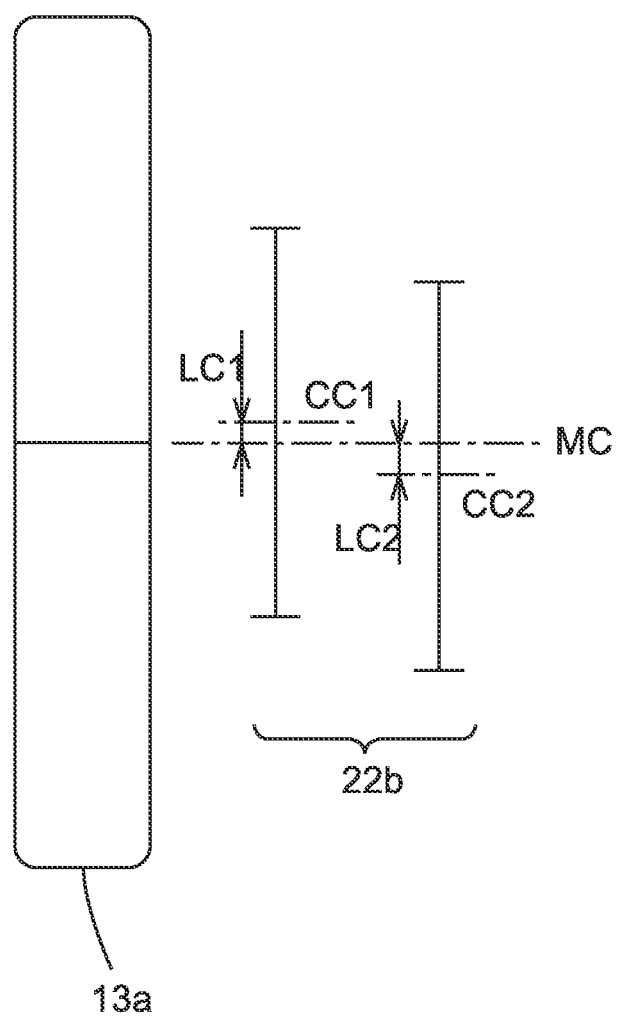
FIG. 13 is a diagram showing a variation example of a distance of displacing center locations.

FIG. 13 and FIG. 14 are diagrams showing a variation example of a distance of displacing the center locations.

The shape center of the coil pattern formed on the substrate layer 21a of the first layer, which is nearer to the magnet 13a, is CC1. A distance between CC1 and MC, which is the center of the magnet 13a, is LC1. The shape center of the coil pattern formed on the substrate layer 21b of the second layer, which is farther from the magnet 13a, is CC2. A distance between CC2 and MC, which is the center of the magnet 13a, is LC2. The following relation is satisfied.

$$LC1 < LC2$$

In other words, in each of the substrate layers 21, the distance between the center location in shape of the coil patterns and the center of the magnet becomes longer as substrate layer 21 is more distant from the magnet.

The magnetic flux generated by the magnet 13a varies in density according to the distance to each of the substrate layers 21a, 21b. Therefore, the sensitivity is influenced by the change of the density. In addition, if the density is low, it also means that magnetic flux is widely distributed. Considering the above, as an example to flatten the amount of change of sensitivity, the distance from the center of the magnet is specified to be longer at the farther side where the magnetic flux should be widely distributed.

(Sixth Embodiment)

Although the relation is LC1<LC2 in the example of FIG. 13 and FIG. 14, the relation is not limited to this example. For example, the relation can be LC1>LC2 or LC1=LC2 if the amount of change of sensitivity can be flattened depending on the shape of the coil pattern.

(Seventh Embodiment)

Figure 15:
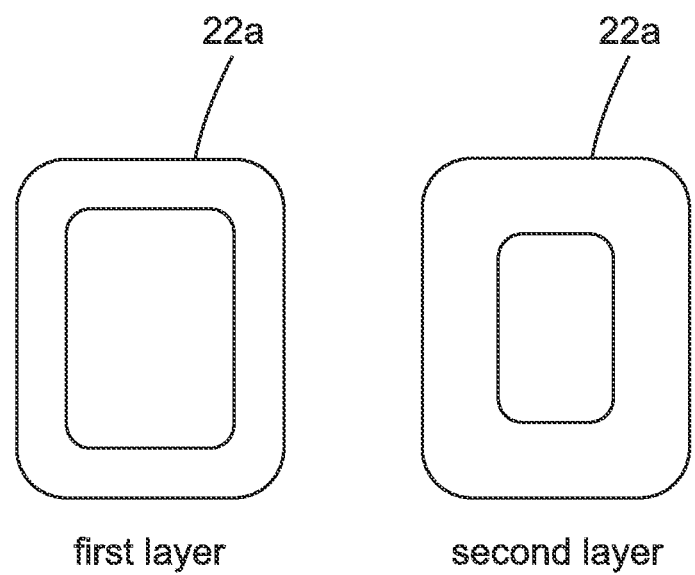
FIG. 15 is a diagram showing a variation example of a coil width.

FIG. 15 is a diagram showing a variation example of the coil width.

As shown in the figure, the coil width of the substrate layer 21a of the first layer is narrower than the coil width of the substrate layer 21a of the second layer. The coil width is wider in the substrate layer 21a of the second layer. In other words, the coil width of the coil pattern is wider at nearer side to the magnet 13a than the farther side.

The difference of the coil width explained above is specified because distribution of the magnetic flux varies according to the distance from the magnet 13a. The amount of change of sensitivity is flattened by widening the coil width at the farther side where the magnetic flux should be widely distributed.

(Other Embodiments)

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. An optical disc actuator comprising a magnet and a coil substrate for driving a movable portion of the optical disc actuator relatively to a fixed portion, wherein
    the coil substrate is formed by a plurality of laminated substrate layers,
    coil patterns are formed on predetermined portions of each of the substrate layers,
    the coil patterns having an approximately same shape are connected with each other to form coils at each of the predetermined portions,
    the magnet has an approximately rectangular shape,
    center locations in the shape of the coil patterns are displaced between neighboring substrate layers opposite to each other with respect to a center in the approximately rectangular shape of the magnet in a direction of driving the movable portion,
    the coil patterns include a focus coil that drives the movable portion in a Z-axis direction and a tracking coil that drives the movable portion in an XY-plane, and
    the center locations in the shape are displaced a longer distance in the coil patterns of the focus coil than the coil patterns of the tracking coil.

2. An optical disc drive device, comprising:
    an optical disc actuator that holds a movable portion having an objective lens movable relatively to a fixed portion and drives the movable portion relatively to the fixed portion, wherein
    the optical disc drive device is capable of rotating an optical disc and linearly driving the fixed portion in a radial direction of the optical disc,
    the optical disc actuator has a magnet and a coil substrate for driving the movable portion,
    the coil substrate is formed by a plurality of laminated substrate layers,
    coil patterns are formed on predetermined portions of each of the substrate layers,
    the coil patterns having an approximately same shape are connected with each other to form coils at each of the predetermined portions,
    the magnet has an approximately rectangular shape,
    center locations in the shape of the coil patterns are displaced between neighboring substrate layers opposite to each other with respect to a center in the approximately rectangular shape of the magnet in a direction of driving the movable portion,
    the coil patterns include a focus coil that drives the movable portion in a Z-axis direction and a tracking coil that drives the movable portion in an XY-plane, and
    the center locations in the shape are displaced a longer distance in the coil patterns of the focus coil than the coil patterns of the tracking coil.

3. An optical disc actuator comprising a magnet and a coil substrate for driving a movable portion of the optical disc actuator relatively to a fixed portion, wherein
    the coil substrate is formed by a plurality of laminated substrate layers,
    coil patterns are formed on predetermined portions of each of the substrate layers,
    the coil patterns having an approximately same shape are connected with each other to form coils at each of the predetermined portions, and
    center locations in the shape of the coil patterns are displaced between neighboring substrate layers,
    the coil patterns include a focus coil that drives the movable portion in a Z-axis direction and a tracking coil that drives the movable portion in an XY-plane, and
    the center locations in the shape are displaced a longer distance in the coil patterns of the focus coil than the coil patterns of the tracking coil.

4. The optical disc actuator according to claim 3, wherein when n is defined as an integral equal to or more than 1 and the substrate layers include more than 3 layers, directions of displacing the center locations in the shape of the coil patterns are same between an n-th substrate layer and an (n+2)-th substrate layer.

5. The optical disc actuator according to claim 3, wherein a width from an innermost periphery of the coil patterns to an outermost periphery is wider in the coil patterns nearer to the magnet than the coil patterns farther from the magnet.

6. The optical disc actuator according to claim 3, wherein a displacement distance between the center locations in the shape varies according to a direction of driving the movable portion driven by the coils, and
    the displacement distance is longer in the direction toward which the movable portion is driven for a longer distance than the direction toward which the movable portion is driven for a shorter distance.

7. The optical disc actuator according to claim 3, wherein a distance of displacing the coil pattern between the neighboring substrate layers is approximately the same as a coil width of the coil patterns.

8. The optical disc actuator according to claim 3, wherein a coil width of each of the coil patterns is wider at a wide portion, which is arranged on a predetermined direction in a circumference, than another portion, and
    the wide portion is formed in a direction toward which the center locations of the coil patterns are displaced from a center of a magnet.

9. The optical disc actuator to claim 8, wherein each of the coil patterns is formed to be an approximately rectangular shape,
    the coil width is approximately the same at three sides, and
    the coil width of another one side is the wide portion.

10. The optical disc actuator according to claim 3, wherein a distance between the center location in shape of the coil patterns and the center of the magnet becomes longer as the substrate layers are more distant from the magnet.

11. The optical disc actuator according to claim 3, wherein the coils include a focus coil to drive the movable portion in a focal direction and a tracking coil to drive the movable portion in a tracking direction, and the center locations in the shape of the coil patterns are displaced between the neighboring substrate layers toward the focal direction in the focus coil and toward the tracking direction in the tracking coil.

* * * * *